United States Patent [19]

Kugelmann, Sr.

[11] Patent Number: 4,783,356
[45] Date of Patent: Nov. 8, 1988

[54] VACUUM-TYPE INSULATION ARTICLE HAVING AN ELASTIC OUTER MEMBER AND A METHOD OF MANUFACTURING THE SAME

[75] Inventor: Franz J. Kugelmann, Sr., Juneau, Ak.

[73] Assignee: Nudvuck Enterprises, Juneau, Ak.

[21] Appl. No.: 841,855

[22] Filed: Mar. 20, 1986

[51] Int. Cl.⁴ .......................... B32B 1/04; B32B 3/02
[52] U.S. Cl. ................................ 428/69; 428/116; 428/174; 428/182; 428/184; 428/186
[58] Field of Search ............. 428/69, 116, 158, 182, 428/184, 186, 174

[56] References Cited

U.S. PATENT DOCUMENTS

| | | | |
|---|---|---|---|
| 1,488,504 | 4/1924 | Keyes | 156/206 |
| 1,780,739 | 11/1930 | Berg | 428/72 |
| 2,608,502 | 8/1952 | Merriman | 154/110 |
| 3,520,763 | 7/1970 | Holland | 161/68 |
| 3,864,200 | 2/1975 | Marshall | 161/135 |
| 4,510,010 | 4/1985 | Schramm, deceased et al. | 156/383 |
| 4,579,756 | 4/1986 | Edgel | 428/69 |

Primary Examiner—John Kittle
Assistant Examiner—P. R. Schwartz
Attorney, Agent, or Firm—Graybeal, Jensen & Puntigam

[57] ABSTRACT

An article of insulation and a method for making same. Outer sheet-like elements (22,24) of elastic deformable material are secured by adhesive to a base element (20) of rigid deformable material in a particular pattern which defines unbonded areas which are each bounded entirely by adhesive. The combination of the two outer elements (22,24) and the base element (20) is then deformed, following which the base element (20) retains its deformed shape while the outer elements (22,24) spring back to their original shape, leaving voids between the base element (20) and the outer elements (22,24) in which there is a partial vacuum.

1 Claim, 4 Drawing Sheets

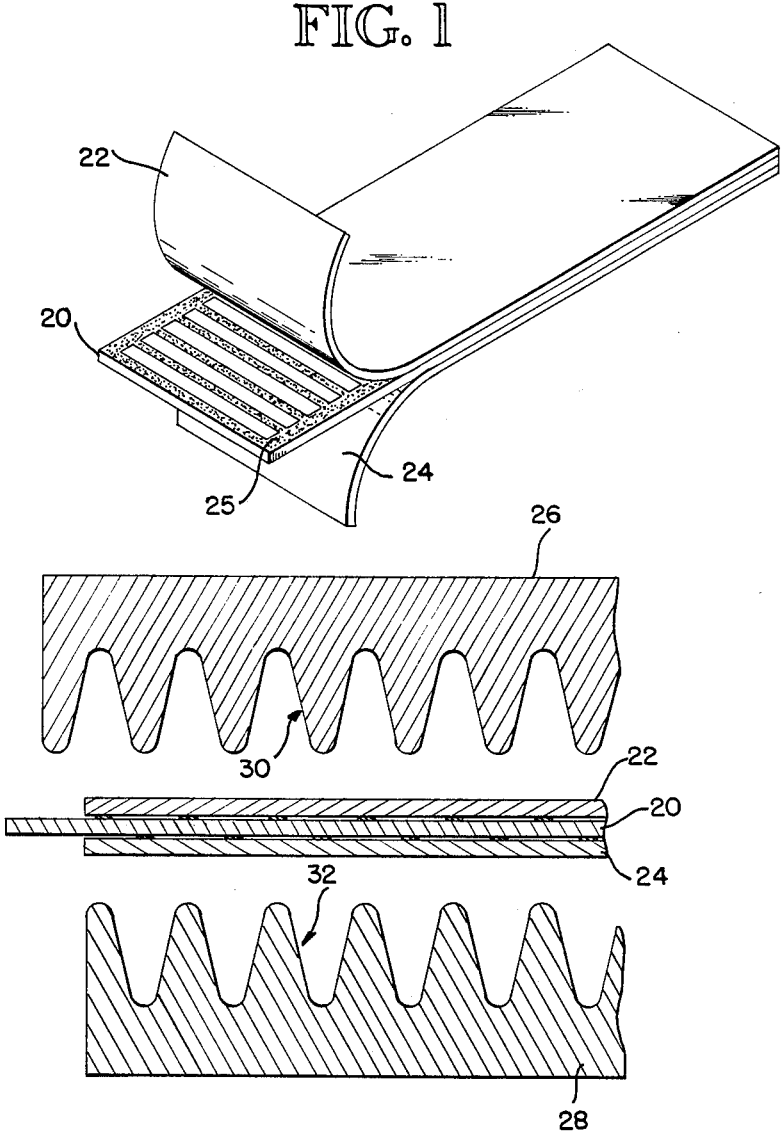

VACUUM-TYPE INSULATION ARTICLE HAVING AN ELASTIC OUTER MEMBER AND A METHOD OF MANUFACTURING THE SAME

TECHNICAL FIELD

This invention relates generally to the insulation art, and more particularly concerns an article of insulation, and a method of manufacturing same, wherein the article of insulation includes portions thereof which are at least partially evacuated.

BACKGROUND ART

It is well known that a vacuum acts as a barrier to heat flow, and hence, certain insulating materials have included a vacuum or partial vacuum to increase their heat insulating effect. The insulating effect will depend upon the extent of the vacuum, as well as the configuration of the remainder of the structure, including the amount of continuous structural contact between the opposing surfaces, because such structural contact will result in heat conduction between the surfaces.

An example of a partially evacuated multi-layer article of insulation is shown in U.S. Pat. No. 1,780,739 to Berg. Other multi-layer articles consist of thin layers of metal foil which are separated by low conductance spacers, all of which are in a vacuum. However, such articles which do include a vacuum, particularly multi-layer embodiments, are typically used only for special purpose installations, such as in cryogenic applications, due to the high cost and difficulty of manufacture of such materials. Prior to applicant's invention, to the best of applicant's knowledge, there were not any vacuum insulation articles which could compete economically with other insulation materials and which could be manufactured and handled conveniently.

DISCLOSURE OF INVENTION

Accordingly, the present invention is an article of insulation having voids therein characterized by at least a partial vacuum, wherein the article includes a base element comprising a relatively rigid, deformable, inelastic material having a cross-sectional configuration which includes a sequence of peaks and valleys, and includes at least one outer element which is secured to the base element in such a manner to define unbonded areas on the base element and the outer element, said unbonded areas being bounded by portions of the base element and the outer element which are secured together, wherein the outer element comprises a deformable elastic material and wherein the article is characterized by a partial vacuum in the voids defined by adjacent peaks of the base element and the outer element.

The invention also includes a method of manufacturing the article of insulation. The method includes the step of securing a first layer of material, which is characterized as deformable and elastic, to one surface of a base layer of material, which is characterized as relatively rigid, deformable, and inelastic, in such a manner that there is defined on the base layer substantial unbonded areas, the unbonded areas being completely bounded by the portions of the base layer and the first layer which are secured together, and the step of deforming the combination of the first layer and the base layer, such that a pattern of raised portions of said base layer is produced, wherein a partial vacuum is created in at least some of the volumes defined by adjacent raised portions of the base layer and the first layer.

BRIEF DESCRIPTION OF THE DRAWINGS

FIG. 1 is a partially exploded view showing the elements of one embodiment of the article of insulation of the present invention, prior to the deformation step in the process of manufacturing the article.

FIG. 2 is a schematic view showing the forms used in the process of manufacturing a first embodiment of the present invention.

BEST MODE FOR CARRYING OUT THE INVENTION

Figure 3:
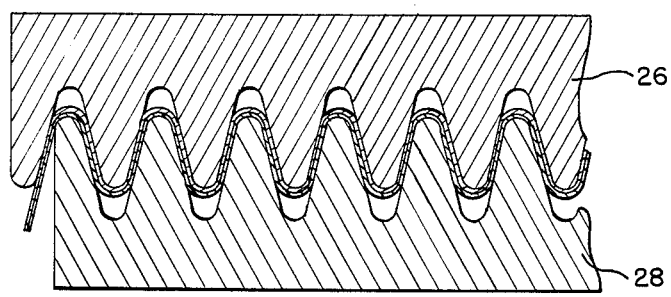
FIG. 3 is a schematic view showing the partially completed deforming step in the process of manufacturing the first embodiment of the present invention.
Figure 4:
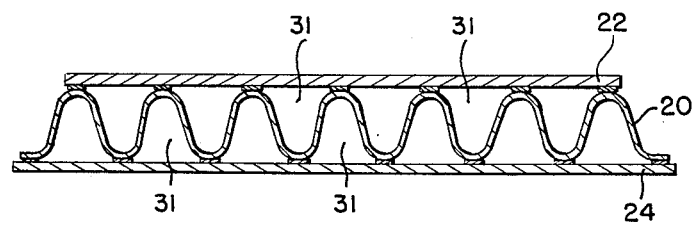
FIG. 4 is a cross-sectional view showing the completed first embodiment of the article of the present invention.
Figure 5:
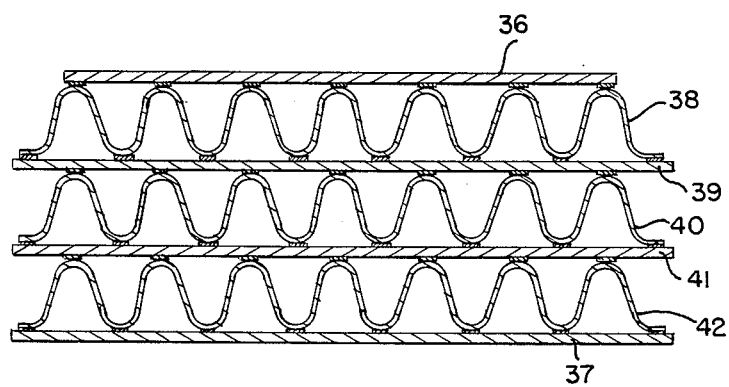
FIG. 5 is a cross-sectional view showing a variation of the embodiment of FIG. 4.

FIGS. 1-4 show several steps in the manufacture of one embodiment of the article of insulation of the present invention. The finished article is shown in FIG. 4. A variation of the embodiment of FIG. 4 is shown in FIG. 5. Referring to FIG. 1, the article includes an inner or base element 20 which in its initial or undeformed state comprises a flat sheet of material which is rigid and non-elastic, but deformable. The outline dimensions of base element 20 will vary, depending upon the selected size of the sheet of insulation to be produced. As an example, however, the article could be produced in standard sizes, such as 16 or 24 inches wide by 8 feet long, for use as insulation in a building wall between adjacent studs.

The thickness of base element 20 will also vary, depending on the material, including specifically the ability of the material to deform without rupturing and the inherent structural strength of the material. Examples of materials suitable for use as base element 20 include metallic, plastic or similar materials, including specifically aluminum and stainless steel. If aluminum is used, a representative thickness is 0.04 inches.

The embodiment also includes two outer sheet elements 22 and 24 of elastic and flexible material, such as elastomers, including rubber, various plastics and other materials, including specifically Buna-N rubber and silicone.

The two outer elements 22 and 24 typically have slightly smaller dimensions than base element 20, for reasons clarified hereinafter, and can vary in thickness depending on the type of material used. For the specific example of Buna-N rubber, the thickness of base element 20 will be approximately 1/16th inch.

The outer elements 22 and 24 are bonded to the base element 20 by means of a thermosetting, thermoplastic or elastomeric adhesive, including thermosetting epoxies such as "ARALDITE", marketed by Ciba Corp. and "EPON", marketed by Shell Chemical Company. The adhesive is applied in a specific pattern, referred to as 25 in the embodiment shown, to the upper and lower surfaces of base element 20.

The adhesive pattern may take various configurations, including oval, square, round or other shapes, although there should be no discontinuities in the line of bonding, so that the non-bonded areas are completely surrounded or bounded by lines or areas of adhesive. The bonding or adhesive pattern 25 is preferably regular in configuration, but arranged so as to leave a relatively large total area which is non-bonded compared to the area which is bonded.

In the particular embodiment of FIGS. 1–4, the base element 20 is rectangular and the bonding area comprises elongated areas of adhesive along the four edges of the base element and narrow lines of adhesive which extend between two opposing elongated areas, laterally of the rectangular base element, at specific intervals therealong, thus forming a sequence of narrow rectangular unbonded areas which extends longitudinally of the base element.

The adhesive pattern is the same on both sides of base element 20, except that the pattern on one side is offset longitudinally by one-half the width of the unbonded areas, so that each successive lateral bonding line on one surface of base element 20 is in registry with the center of an unbonded area on the opposite surface thereof.

The outer elements 22 and 24 are secured to the opposing surfaces of base element 20 in such a manner that the resulting multi-layer product (a rigid center element with two outer resilient elements) has a relatively small amount, if any, of residual gas trapped between the respective outer elements 22 and 24 and base element 20, for reasons clarified hereinafter. One effective way to reduce the amount of trapped residual gas is to manufacture the article in an environment which is itself partially evacuated of such gas.

The multi-layer element shown in FIG. 1 is now ready for the deformation step in the process for manufacturing the embodiment of FIGS. 1–4. Initially, the multi-layer element must be mounted such that base element 20 is securely fixed around its periphery. Therefore, element 20 typically will extend a small distance beyond the respective peripheries of elements 22 and 24, as shown in FIG. 2. If this is not done, the base element might deform by curling into the forms.

In FIGS. 2–3, male and female forms 26 and 28 have corrugated forming surfaces 30 and 32, respectively. Female form 28 is offset from male form 26 laterally by an amount equal to approximately one-half of the corrugation pattern, so that the two forms can be conveniently mated together. The forming surface 30 of the male form 26 conforms to the forming surface 32 of female form 28, so that when forms 26 and 28 are moved together, the peaks of the forming surfaces of one form fit into the valleys of the other form and vice versa.

The multi-layer element shown in FIG. 1 is initially positioned between the forms such that the successive lines of adhesive which bound the unbonded areas on each surface of base element are in registry with the valleys in the associated forming surface. The male and female forms 26 and 28 are then brought together under significant pressure, with the peripheral edge of base element 20 being securely fixed or tied down. During deformation, referred to in the industry as drawing or deep drawing, the base element 20 is deformed by plastic deformation or stretching, such that the element becomes thinner, but does not rupture. The resulting multi-layer article has a corrugated shape which is in accordance with the mating forming surfaces of the two forms, as shown in FIG. 3.

Next, the two forms are released and move apart, freeing the now deformed multi-layer element. The rigid base element 20 retains its corrugated shape, while the two outer elements 22 and 24 rebound to their flat shape, due to the elastic nature of the material, with the outer elements being secured to the base element along the edges thereof and along the peaks of the base element on each side thereof. There are resulting voids 31—31 defined by base element 20 and outer elements 22 and 24, within which there is at least a partial vacuum, created when the resilient outer elements rebound to their original configuration.

The partial vacuum pressure in the voids 31 in the embodiment shown is 0.1 PSI absolute, or less. The vacuum pressure can be improved by providing corrugation with a greater depth. The deeper the corrugation, the better the partial vacuum, and the better the insulating effect.

Since a partial vacuum significantly reduces heat convection across the insulation material, the article of FIG. 4 has a good insulating effect. The small areas of contact between base element 20 and outer elements 22 and 24 result in a relatively small heat transfer across the insulation, but this is rather minimal due to the relatively small areas of contact.

As a final step in the process, the article of insulation shown in FIG. 4 is typically sprayed with a sealant or sealing lacquer, which provides an impermeable outer surface layer over the entire article. Alternatively, the forming step could be carried out in a sealing bath, which would have the same end result. Examples of suitable sealants include sealing lacquers comprised of solvents with high polymers by Leybold, and the following sealants: Glyptal Lacquer by General Radiologie, Anaerobic Permafil by General Electric and Loctite by American Sealants.

Although the article of FIG. 4 shows two outer elements 22 and 24, it should be understood that an article of insulation within the spirit of the present invention could be made having only one outer element, although the insulating effect in such an embodiment would be decreased. Furthermore, it should be understood that an article of insulation could be made using the same principles as outlined above, except with several successive layers of elastic outer elements and rigid base elements. In such a configuration, such as shown in FIG. 5 for a 3 layer embodiment, there are two extreme outer elements 36 and 37 and successive elements between elements 36 and 37 of a first base element 38, a first inside outer element 39, a second base element 40, a second inside outer element 41 and a third base element 42. Such an arrangement provides an increase in insulation effect, and protection relative to loss of vacuum due to puncture, etc. of one or more of the voids in the article.

As stated above, the normal pressure differential between the standard atmosphere and the voids is approximately 14 psi. The pressure differential in the multi-layer embodiment of FIG. 5 is decreased almost to 0 PSI for the inner layers so that the elements comprising those layers can be made thinner than otherwise, without affecting the strength of the article as a whole or the total insulating effect of the article.

Another advantage to the article of FIG. 5 is that it can be temporarily compressed, by applying pressure against opposing surfaces thereof, which results in a significant reduction in the volume of the insulting material. The reduction in volume significantly increases the convenience, and reduces the expense, of transportation of the article. At its destination, the multi-layer embodiment is released from its compressed state and the article expands to its original shape.

Figure 6:
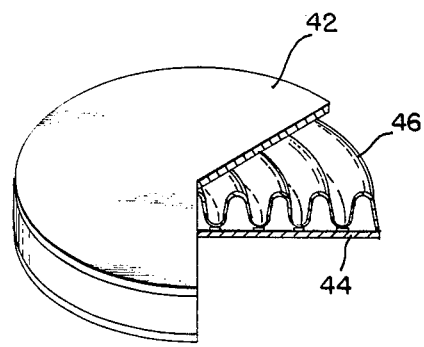
FIG. 6 shows another embodiment of the article of the present invention.

FIG. 6 shows another embodiment of the present invention which is directed toward a different configuration or pattern of deformation of the base element. In FIG. 6, the two outer elements 42 and 44, as well as base element 46, are circular in outline, with the exposed peripheral edge of the base element 46 forming the outer peripheral edge of the article of insulation. The deformation forms are configured in concentric circles, so that following the deformation step, the base element of the article of insulation is corrugated in a series of concentric circles. The insulating effect is equivalent to that of the article shown in FIG. 4.

Figure 7:
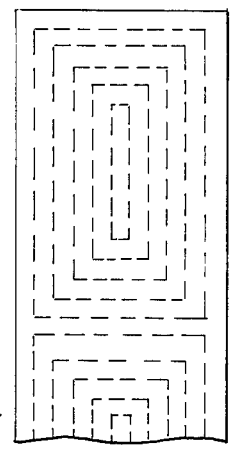
FIG. 7 shows a variation of the embodiment shown in FIG. 6.

It should also be understood that other configurations or deformation patterns could be used, including elliptical, square and octangonal. FIG. 7, for instance, shows a rectangular pattern of deformation, which like the embodiment of FIG. 6 requires no separate end closures, such as would normally be required by the configuration of FIG. 4.

Figure 9:
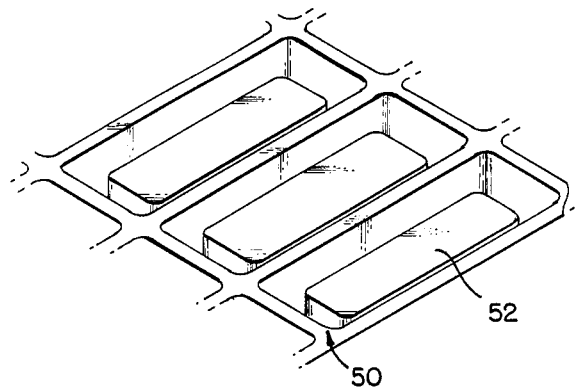
FIG. 9 is a closeup view of a portion of the embodiment shown in FIG. 8.
Figure 8:
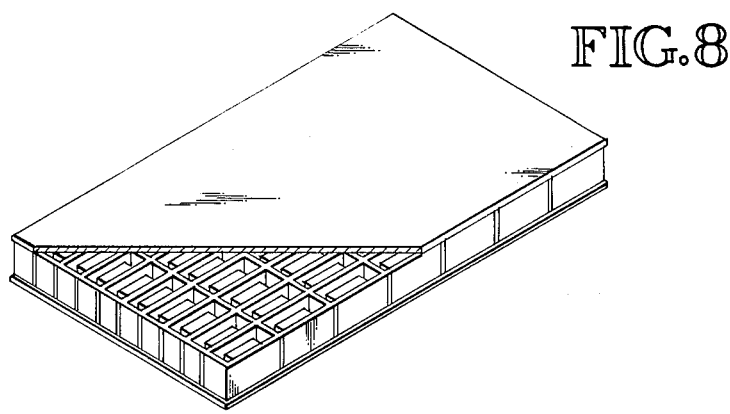
FIG. 8 shows a partially cutaway view of still another embodiment of the article of the present invention.

It should also be understood that the deformation pattern of the base element is not limited to a corrugated pattern. FIGS. 8 and 9, for instance, show an example of a different pattern using compartments or chambers having a particular configuration. In such an arrangement, the chambers or compartments must be configured to provide similar volumes opening to both surfaces of the base element.

In FIGS. 8 and 9, the compartments are defined by a series of perpendicular walls which extend both longitudinally and laterally at spaced intervals. Each compartment, i.e. compartment 50, thus is defined by four perpendicular walls, forming a compartment volume. In the embodiment shown, each compartment is rectangular, but other configurations are useful as well. The center of each compartment has a raised portion 52, which has a height which is slightly more than half of the overall height of the compartment. The top of the compartment is open while the bottom of the compartment is defined by the surface connecting the edge of the raised portion with the four walls.

In FIG. 9, the portion of the total compartment volume between the four walls and the raised portion opens upwardly, while the portion of the total compartment volume defined by the raised portions opens downwardly. In the embodiment shown, the two volume portions are approximately equal. The advantage to the compartment embodiment, although the forms are usually somewhat more complex, is protection against possible loss of vacuum. Only a small loss of vacuum would occur for a single penetration. Although FIGS. 8 and 9 show a particular deformation pattern, it should be understood, however, that other deformation patterns could be used, including round, elliptical or conical shaped compartments.

Figure 10:
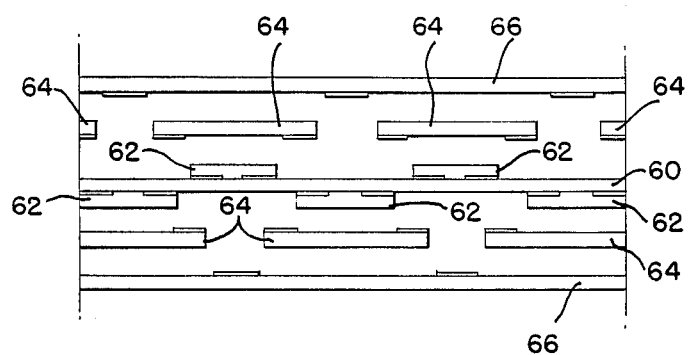
FIG. 10 is a cross-sectional exploded view of yet another embodiment of the article of the present invention prior to the deformation step in the process of manufacturing the article.
Figure 11:
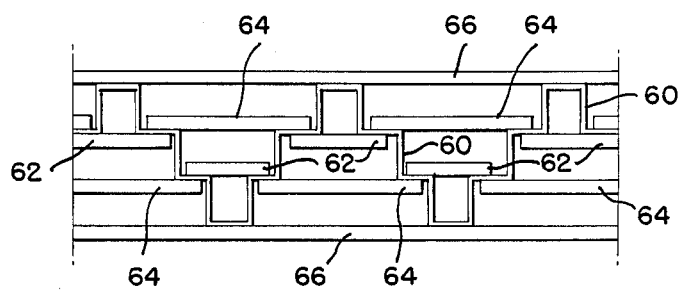
FIG. 11 is a cross-sectional view showing the completed embodiment of FIG. 10.

FIGS. 10 and 11 show a further embodiment using a single base element and several layers of partial or segmented outer elements arranged in a particular configuration. FIG. 10 is an exploded view showing the various layers of the article of insulation. Base element 60, which is a complete, i.e. continuous, element, is positioned at the center of the article, and the first segmented layers 62—62 on both sides of the base element comprise a plurality of spaced segments, with relatively wide separations between them. Adhesive is applied to the spaced segments at the opposing ends of each segment. Second segmented layers, 64—64, also on both sides of the base element, comprise a plurality of spaced segments with a relatively small separation between them.

Adhesive is also applied to the edge portions of each of segments 64—64. Continuous third layers 66 form outer elements for the article of FIGS. 10 and 11. By way of example, the patterns of the segmented layers and the adhesive pattern are arranged in Figure 10 for use with a stairstep-shaped deformation form. When the deformation step is completed, the resulting article is shown in FIG. 11.

Thus, a new article of insulation and method for manufacturing the article have been described and shown. The method is a convenient and inexpensive means to form an article of insulation having voids therein within which is a partial vacuum. In manufacturing the article, a particular arrangement of layers of materials, having particular characteristics is used, and this arrangement is then deformed in a particular manner to create partially evacuated voids. As described above, various arrangements and patterns of deformation can be used within the scope of the present invention.

Although a preferred embodiment of the invention has been disclosed herein for illustration, it should be understood that various changes, modifications and substitutions may be incorporated in such embodiment without departing from the spirit of the invention, which is defined by the claims which follow.

I claim:
1. An article of insulation, comprising:
 a base element comprising a relatively rigid, deformable, elastic material having a cross-sectional configuration which defines successive peaks and valleys; and
 at least two outer elements on each side of the base element, wherein at least one of the outer elements on each side is an outermost outer element and wherein the outer elements other than the outermost outer elements are positioned between the outermost outer elements and the base element, wherein the outer elements positioned between the base element and the outermost outer elements are segmented and arranged in a selected manner such that there is contact between the base element and the outermost outer elements, as well as contact between the base element and the remaining outer elements, said outer elements secured to the base element in such a manner as to define unbonded areas on the base element and the outer elements, the outer elements comprising a deformable elastic material, wherein the article is further characterized by a partial vacuum in the voids defined by adjacent peaks of said base element and said outer element.

* * * * *